(12) United States Patent
Henderson et al.

(10) Patent No.: US 7,013,367 B2
(45) Date of Patent: Mar. 14, 2006

(54) CACHING ASSOCIATIVE MEMORY USING NON-OVERLAPPING DATA

(75) Inventors: Alex E. Henderson, Hillsboro, OR (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 10/622,311

(22) Filed: Jul. 17, 2003

(65) Prior Publication Data

US 2004/0078516 A1    Apr. 22, 2004

Related U.S. Application Data

(60) Provisional application No. 60/397,067, filed on Jul. 18, 2002.

(51) Int. Cl.
*G06F 12/08* (2006.01)

(52) U.S. Cl. .................. 711/128; 711/100; 711/108; 711/118; 711/154

(58) Field of Classification Search ........... 711/100, 711/117, 108, 118, 128, 151, 154, 158, 200
See application file for complete search history.

(56) References Cited

U.S. PATENT DOCUMENTS

| | | | | |
|---|---|---|---|---|
| 4,084,225 | A | * | 4/1978 | Anderson et al. ............ 711/206 |
| 5,226,005 | A | * | 7/1993 | Lee et al. ...................... 365/49 |
| 5,283,882 | A | * | 2/1994 | Smith et al. .................. 365/49 |
| 5,396,470 | A | * | 3/1995 | Storn ...................... 365/230.01 |
| 5,420,993 | A | * | 5/1995 | Smith et al. ................. 711/206 |
| 5,438,535 | A | * | 8/1995 | Lattibeaudiere .............. 365/49 |
| 5,502,832 | A | * | 3/1996 | Ali-Yahia et al. ............ 711/108 |
| 5,999,435 | A | | 12/1999 | Henderson et al. |
| 6,175,514 | B1 | | 1/2001 | Henderson et al. |
| 6,362,993 | B1 | | 3/2002 | Henderson et al. |
| 6,378,042 | B1 | | 4/2002 | Henderson et al. |
| 6,426,647 | B1 | | 7/2002 | Henderson |
| 6,446,188 | B1 | | 9/2002 | Henderson et al. |
| 6,470,436 | B1 | | 10/2002 | Croft et al. |
| 2003/0012198 | A1 | * | 1/2003 | Kaganoi et al. ............. 370/392 |

* cited by examiner

*Primary Examiner*—Tuan V. Thai
(74) *Attorney, Agent, or Firm*—Blakely, Sokoloff, Taylor & Zafman LLP

(57) ABSTRACT

An apparatus and method for caching data in an associative memory cache using a single non-overlapping entry, wherein the non-overlapping entry is created from a matching entry and one or more overlapping entries that are stored in a primary associative memory.

49 Claims, 11 Drawing Sheets

| ENTRY | RANGE | COMPARAND | PRIORITY | ASS. DATA | |
|---|---|---|---|---|---|
| A | 128.192.128.144 → 128.192.128.145 | 1001000X | 4 | DATA A | ~410a |
| B | 128.192.128.144 → 128.192.128.159 | 1001XXXX | 1 | DATA B | ~410b |
| C | 128.192.128.152 → 128.192.128.155 | 100110XX | 3 | DATA C | ~410c |
| D | 128.192.128.152 → 128.192.128.159 | 10011XXX | 2 | DATA D | ~410d |

CACHING ASSOCIATIVE MEMORY USING NON-OVERLAPPING DATA

CLAIM OF PRIORITY

This application claims the benefit U.S. provisional application No. 60/397,067, entitled "Caching Associative Memory Using Non-Overlapping Data," filed on Jul. 18, 2002.

FIELD OF THE INVENTION

The invention relates generally to associative memories and, in particular, to a method and apparatus for caching associative memory using non-overlapping data.

BACKGROUND OF THE INVENTION

Traditional memory devices are accessed by specifying an address of one or more particular locations within the memory, and the data stored at these locations is retrieved from the memory. On the other hand, an associative memory is a memory device or system that can be accessed by searching for matching content rather than by specifying a memory address. Generally, the information stored in an associative memory is accessed by comparing an input, or search key, with the "comparand" of each entry stored in the memory. If the search key matches the comparand of an entry, the associative memory will return the data stored in that entry. The data associated with an entry may include a memory address (to a memory location where data associated with the entry is stored), as well as any other types of data. If multiple entries of the associative memory match the search key, the associative memory will typically return the entry having the highest priority. Priority of an entry in the associative memory may be determined by the position of that entry in the memory or by a priority value stored as part of that entry. Associative memories are used in a variety of applications, including routing tables for matching destination addresses (e.g., Internet Protocol, or IP, addresses) and look-up tables in packet classification engines, as well as other database applications.

One type of associative memory is content addressable memory (CAM), and there are two common types of CAM devices: binary CAMs and ternary CAMs. A binary CAM requires an exact match between all bits of the search key and all bits of a comparand in order for a match to occur. A ternary CAM allows a comparand to be expressed as a range, wherein masked bits represent "don't care" bits that are ignored in the comparison process and that are essentially filtered from the comparand. For example, the comparand "100101XX" has two masked bits (each represented by an "X") and spans a range from 10010100 to 10010111. The range of a comparand in a ternary CAM is a binary range, which is a range extending from a lower bound (LB) of $LB=(a)(2^m)$ to an upper bound (UB) of $UB=(a+1)(2^m)-1$, where "a" is an integer.

Another type of associative memory is boundary addressable memory (BAM). The comparand of an entry of a BAM device includes a lower bound (LB) and an upper bound (UB), and the comparand spans a range from the LB to the UB. There is, however, no requirement that the upper and lower bounds have any relation to a power of "2"—a requirement of ternary CAMs, where ranges are expressed using the same power of "2" (e.g., $2^m$), as noted above—and such ranges are referred to herein as "arithmetic" or "non-binary" ranges.

Referring now to FIG. 1, illustrated is an embodiment of an associative memory system 100. The system 100 includes a search client 110, an associative memory cache 120, and a primary associative memory 130. The search client 110 may comprise a processing device (e.g., a network processor) or a processing system. The associative memory cache 120 may comprise any type of associative memory, such as a CAM or a BAM. Likewise, the primary associative memory 130 may comprise any suitable type of associative memory, including a CAM or BAM, as well as any equivalent implementation, such as an algorithmic search of a static random access memory (SRAM) or a dynamic random access memory (DRAM). In addition to the associative memory cache 120 shown in FIG. 1, the system 100 may include additional levels of associative memory cache.

During operation, the search client 110 sends search requests to the associative memory cache 120, and if the associative memory cache 120 has the requested data—i.e., a cache "hit"—the associative memory cache provides the data to the search client 110. Conversely, if the associative memory cache 120 does not have an entry that matches the search request—i.e., a cache "miss" the primary associative memory 130 is accessed to query whether this memory contains the needed data. If the primary associative memory 130 has an entry matching the search request, the data is forwarded to the search client 110.

When multiple entries in the primary associative memory 130 match the search request, the primary associative memory will generally return the highest priority matching entry. In addition, because the primary associative memory 130 can store comparands expressed as ranges, there may be one or more entries in the primary associative memory that have ranges overlapping the range of the highest priority matching entry. As used herein, the term "overlapping" indicates that the comparands of two or more entries will map to ranges that overlap one another. In prior implementations, in order to ensure correct results after a cache miss, those overlapping entries having a priority greater than that of the matching entry would also be returned by the primary associative memory 130 along with the highest priority matching entry, and the highest priority and higher priority overlapping entries would all be entered into the associative memory cache 120.

Returning all higher priority overlapping entries and the highest priority matching entry does, however, necessitate a large associative memory cache and, further, updating the cache to include these multiple new entries requires more complex replacement algorithms to determine which existing cache entries can be replaced. Also, because the highest priority matching entry is cached along with one or more higher priority overlapping entries, if a subsequent search falls in a range covered by two or more of these entries, multiple matches will result. The associative memory cache will, therefore, need priority resolution logic to determine which of these multiple matching entries has the higher priority.

DETAILED DESCRIPTION OF THE INVENTION

Figure 1:
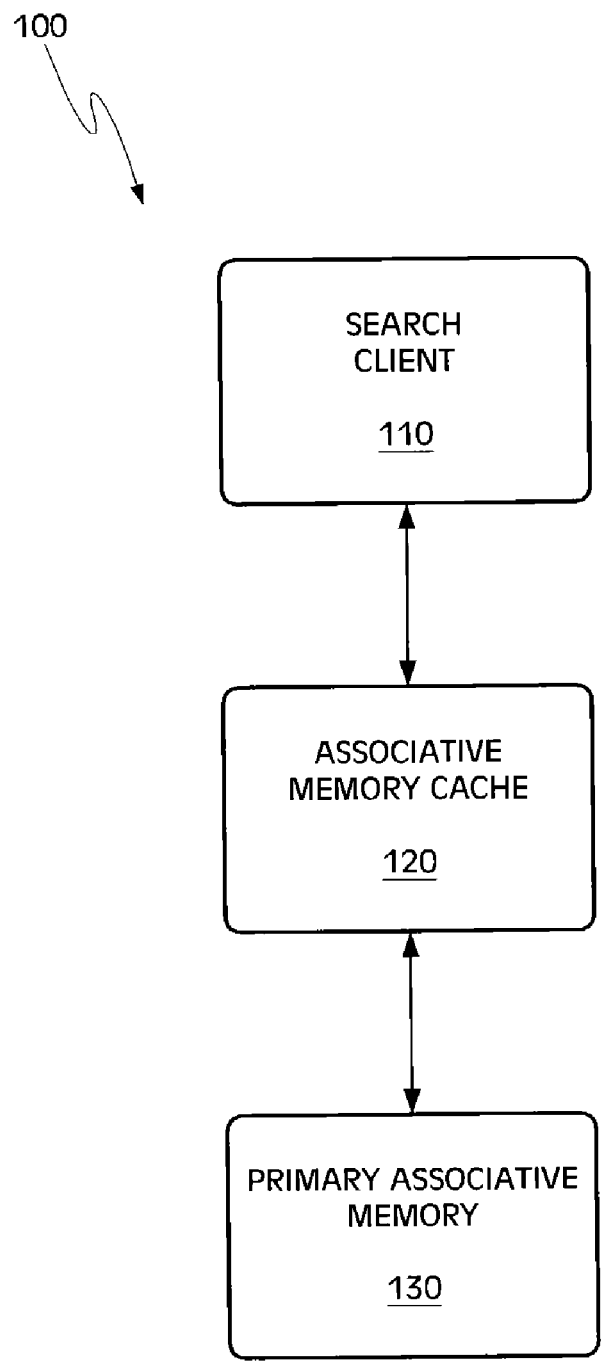
FIG. 1 is a schematic diagram illustrating one embodiment of a conventional associative memory system.
Figure 2A:
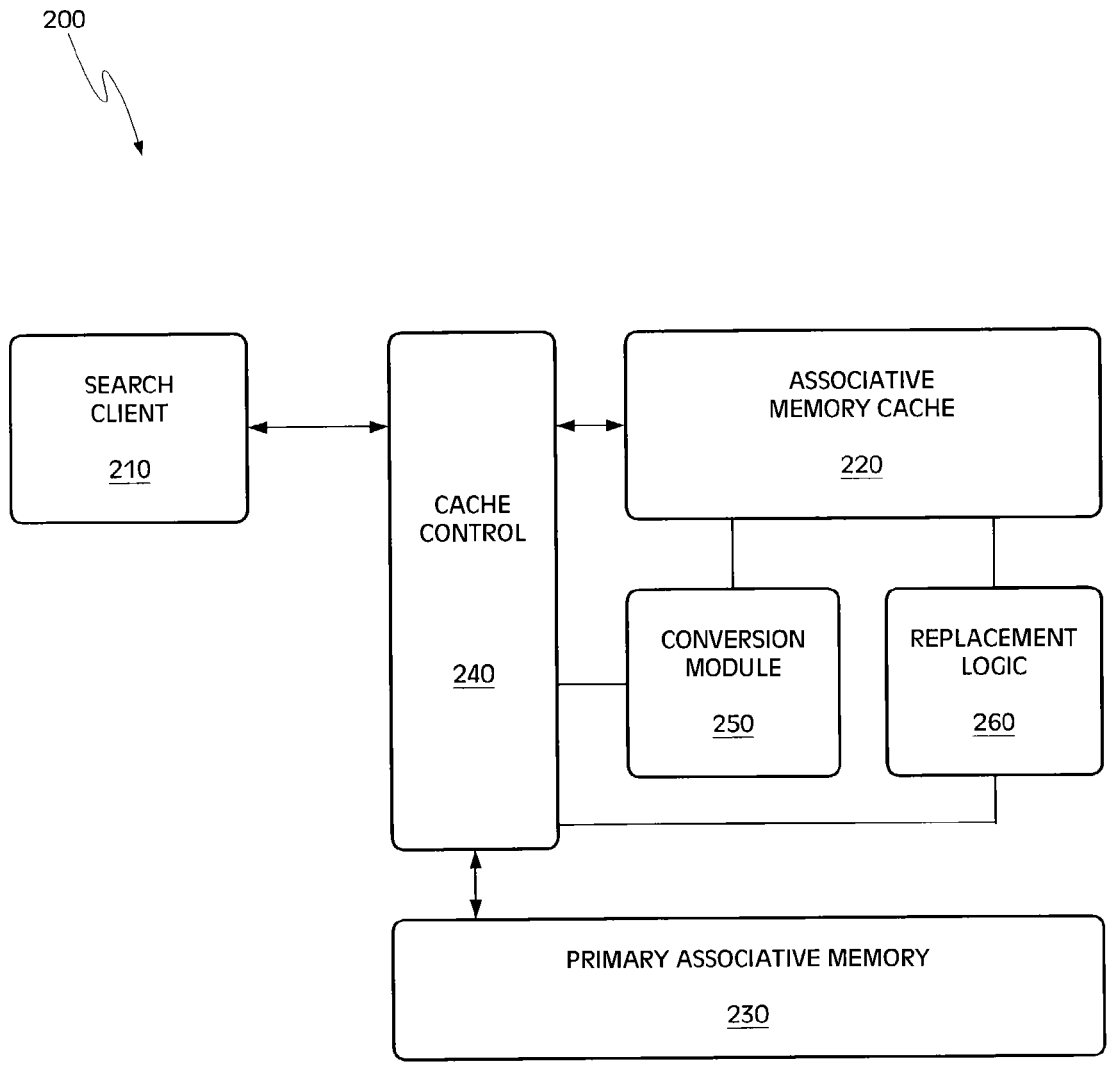
FIG. 2A is a schematic diagram illustrating an embodiment of an associative memory system capable of caching data using a single non-overlapping entry.
Figure 2B:
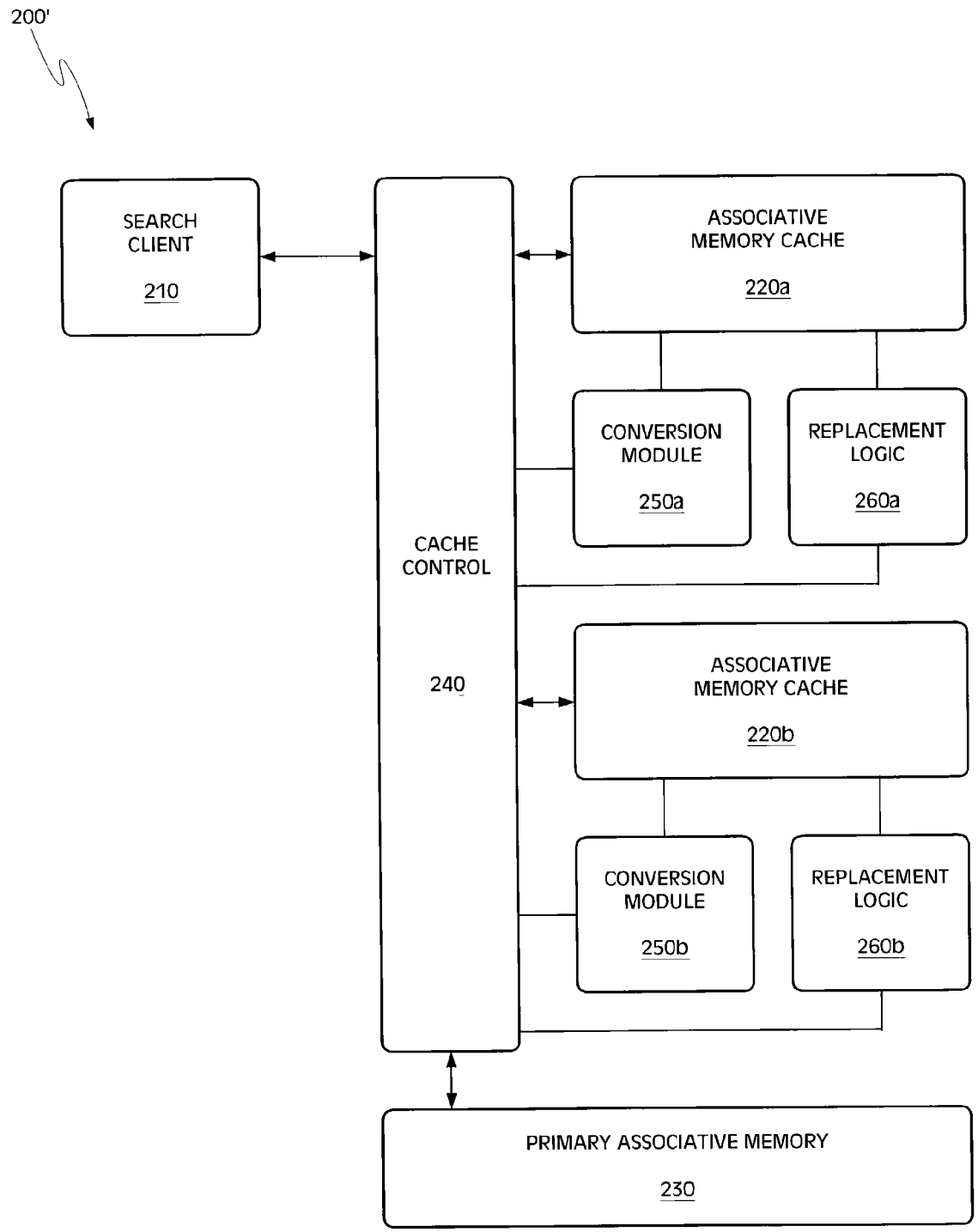
FIG. 2B is a schematic diagram illustrating another embodiment of an associative memory system capable of caching data using a single non-overlapping entry.
Figure 2C:
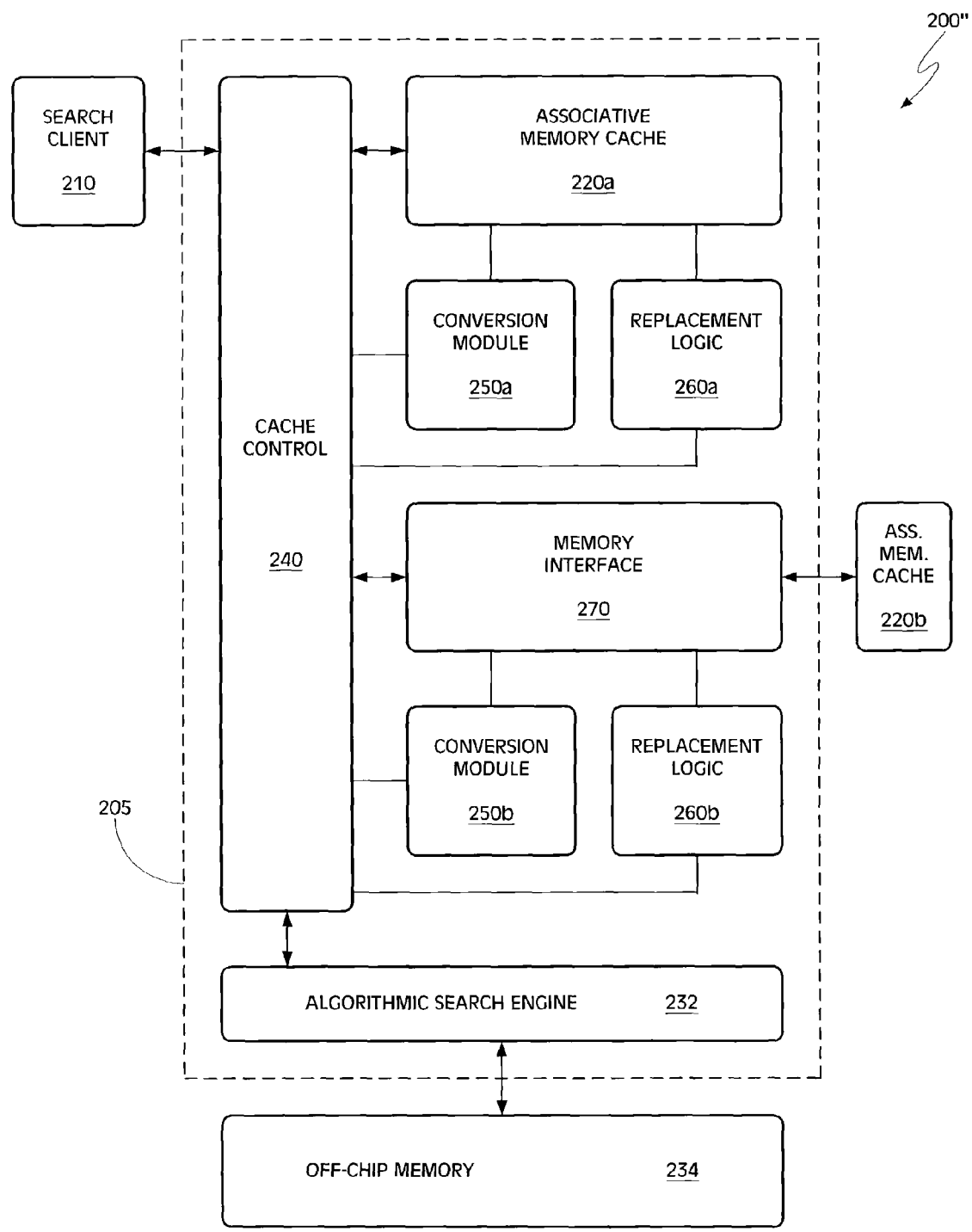
FIG. 2C is a schematic diagram illustrating a further embodiment of an associative memory system capable of caching data using a single non-overlapping entry.

Illustrated in FIGS. 2A through 2C are various embodiments of an associative memory system including an associative memory cache. In response to a cache miss in the associative memory cache that results in one or more higher priority overlapping entries being returned from a primary associative memory along with the highest priority matching entry (or some other lower priority matching entry), the system 200 will convert these multiple entries into a single non-overlapping entry. Embodiments of a method for caching data using a non-overlapping entry derived from a matching entry and a number of higher priority overlapping entries are illustrated in FIGS. 3 through 9. As will be described in more detail below, an entry of an associative cache overlaps the matching entry if the two entries have comparands that map to ranges that overlap. The non-overlapping entry comprises the largest portion of the matching entry's range that does not include any of the ranges of the overlapping entries.

Referring now to FIG. 2A, an associative memory system 200 is shown. The associative memory system 200 includes a search client 210 that is coupled with a cache control 240, which, in turn, is coupled with each of an associative memory cache 220 and a primary associative memory 230. Also coupled with the cache control 240 and associative memory cache 220 are a conversion module 250 and replacement logic 260.

Search client 210 issues search requests to the cache control 240, each search request including a search key. In one embodiment, the search client 210 comprises a processing system (e.g., a central processing unit, or CPU) or a processing device, such as a network processor, a microprocessor, an application specific integrated circuit (ASIC), and the like.

In response to receipt of a search request from search client 210, the cache control 240 will issue a corresponding search request to associative memory cache 220. If there is a cache hit in associative memory cache 220, cache control 240 will forward the data to the search client 210. Conversely, if there is a cache miss, the cache control 240 will forward the search request to the primary associative memory 230. If the primary associative memory 230 includes an entry matching the search key, the data associated with the matching entry is returned by the primary associative memory 230, and the cache control 240 forwards the data to the search client 210. If, however, there are one or more higher priority overlapping entries associated with the matching entry, a single non-overlapping entry will be created, as will be explained in greater detail below. Cache control 240 may be implemented in hardware, software, or any suitable combination of hardware and software.

The associative memory cache 220 may comprise any suitable type of associative memory, such as a CAM (either binary or ternary) or a BAM, as well as any suitable equivalent implementation (e.g., an algorithmic search of a SRAM or DRAM). Associative memory cache 220 can store a number of entries, each entry including a comparand and data (e.g., a memory address) associated with the entry. Each entry may also include a priority value indicating the priority of that entry relative to the other entries. The cache control 240 can search the associative memory cache 220 by comparing the search key against the comparand of each entry stored in the associative memory cache. Also, in one embodiment, all of the associative memory cache entries (or a portion thereof) are searched in parallel. The data stored in the entries of associative memory cache 220 duplicates at least some of the data stored in the primary associative memory 230.

The primary associative memory 230 may comprise any suitable type of associative memory, including a CAM (either binary or ternary), a BAM, or an equivalent implementation. As previously noted, an equivalent implementation may comprise an algorithmic search of a SRAM or DRAM and, by way of example, the algorithmic search may comprise a hashing engine, a binary tree, a sorted table search engine, a binary tree search engine, a multi-bit tree, organ AVL tree (named after its creators Adelson, Veiskii, and Landis). The primary associative memory 230 also stores a number of entries, each of these entries including a comparand and associated data and, perhaps, a priority value. Cache control 240 can search the primary associative memory 230 by comparing the search key against the comparand of each entry stored in the primary associative memory and, in one embodiment, all of the primary associative memory entries (or a portion thereof) are searched in parallel.

A search of the primary associative memory 230 may result in multiple matching entries. As used herein, the term "match" (or "matching") may have a different interpretation depending on the type of associative memory. In the case of a binary CAM, a "match" indicates that all bits of the comparand of an entry match the search key. For a ternary CAM, a "match" indicates that all unmasked bits of the comparand of an entry match corresponding bits of the search key. In the case of a BAM, a "match" indicates that the lower bound of the comparand is less than or equal to the search key and that the comparand's upper bound is greater than or equal to the search key. In one embodiment, if multiple matching entries in the primary associative memory 230 match the search key, priority resolution is performed (by the primary associative memory 230, cache control 240, or other element) to determine which of the matching entries has the highest priority, and the highest priority matching entry is returned by the primary associative memory 230. In another embodiment, the primary associative memory 230 returns a matching entry that does not have the highest priority of all matching entries.

As suggested above, the highest priority entry matching a given search key may also have one or more higher priority overlapping entries. When the highest priority matching entry (or some other lower priority matching entry) has one or more higher priority overlapping entries, the cache control 240 provides the matching entry and the higher priority overlapping entries (or information about these entries) to the conversion module 250. The conversion module converts the highest priority matching entry (or a lower priority matching entry) and the higher priority overlapping entries (or a subset of the higher priority matching entries) to a single non-overlapping entry, which can be stored in associative memory cache 220. The non-overlapping entry comprises the largest possible portion of the matching entry's range that does not include any of the ranges of the overlapping entries. Embodiments of a method for caching data by creating a single non-overlapping entry are described with respect to FIGS. 3 through 9 and the accompanying text below. Conversion module 250 may be implemented in hardware, software, or any suitable combination of hardware and software.

When a single non-overlapping entry (or a highest priority matching entry) is to be entered into the associative memory cache 220, the associative memory cache 220 may be full. If the associative memory cache 220 has reached its storage capacity, an existing entry will need be selected for removal and replacement by the new entry. The replacement logic 260 selects an existing entry in the associative memory cache 220 for replacement, and this selection may be based on any suitable replacement algorithm. Common replacement algorithms include, by way of example and not limitation, least frequently used (LFU), least recently used (LRU), and random replacement (RR). The replacement logic 260 may be implemented in hardware, software, or any suitable combination of hardware and software.

It should be understood that the system 200 is not limited to a single level of cache, as shown in FIG. 2A. Rather, the system 200 may include multiple levels of associative memory cache, and an embodiment of such an architecture is illustrated in FIG. 2B. Referring to this figure, an associative memory system 200' includes a search client 210, a primary associative memory 230, and a cache control 240, all as described above. System 200' also includes a first associative memory cache 220a (e.g., an "L1 cache") and a second associative memory cache 220b (e.g., an "L2 cache"), both coupled with cache control 240. A conversion module 250a and replacement logic 260a are coupled with the first associative memory cache 220a, whereas a conversion module 250b and replacement logic 260b are coupled with the second associative memory cache 220b. The associative memory caches 220a–b, conversion modules 250a–b, and the replacement logic 260a–b generally function as the associative cache memory 220, conversion module 250, and replacement logic 260, respectively, that are shown in FIG. 2A. However, if there is a miss at the first associative memory cache 220a, the cache control 240 may search the second associative memory cache 220b for the needed data, prior to accessing the primary associative memory 230. Those of ordinary skill in the art will appreciate that the system 200' is not limited to two levels of cache and that any suitable number of cache levels may be employed.

The system 200 of FIG. 2A (or 200' FIG. 2B) may be implemented using any suitable architecture. In one embodiment, the various elements of the system 200 (or 200') are located on a single integrated circuit (IC) device. For example, the search client 210, the associative memory cache 220 (or 220a and 220b), the primary associative memory 230, the cache control 240, the conversion module 250 (or 250a and 250b), and the replacement logic 260 (or 260a and 260b) are integrated on a single IC chip. In another embodiment, the search client 210 comprises or is implemented on a separate IC device (e.g., the search client 210 comprises one processing device and the other elements of the system 200 are implemented on a separate IC device). It should, however, be understood that other implementations are possible. For example, the associative memory cache 220 (or one of the associative memory caches 220a, 220b) may comprise an off-chip cache. Similarly, in another embodiment, the primary associative memory 230 comprises an off-chip memory. It should also be understood that certain elements of the system 200 (or 200') may be combined and/or share circuitry. For example, in one embodiment, the cache control 240, conversion module 250 (or 250a–b), and replacement logic 260 (or 260a–b) comprise an integrated unit.

One alternative embodiment of an associative memory system is shown in FIG. 2C. Referring to this figure, a system 200" comprises a search client 210 that is coupled with an IC device 205. In one embodiment, the IC device 205 comprises a processing device, such as a network processor, a microprocessor, ASIC, and the like. However, it should be understood that in other embodiments, the device 205 may comprise any other suitable IC device. Disposed on IC device 205 is a cache control 240, which generally functions as previously described. Coupled with the cache control 240 is a first associative memory cache 220a (e.g., "L1 cache"), a conversion module 250a, and replacement logic 260a, all of which function as described above. Also coupled with cache control 240 is a memory interface 270. The memory interface 270 provides an interface between the cache control 240 and a second, off-chip associative memory cache 220b (e.g., "L2 cache"). In addition, a second conversion module 250b and second replacement logic 260b are coupled with the cache control 240, and the off-chip associative memory cache 220b, conversion module 250b, and replacement logic 260b generally function as set forth above. The primary associative memory of the system 200" is implemented as an algorithmic search of a SRAM, DRAM, or other suitable memory, as previously described. The primary memory comprises an on-chip algorithmic search engine 232 and an off-chip memory 234 (e.g., a SRAM, DRAM, or other memory), as shown in FIG. 2C. Those of ordinary skill in the art will recognize that the architecture depicted in FIG. 2C is but one example of a system upon which the disclosed embodiments may be implemented and, further, that a wide variety of architectures are possible.

In one embodiment, the various embodiments of the method for caching using non-overlapping data, as will be described below, are implemented in software. The software may comprise a set of instructions stored in a memory (either on-chip or off-chip) that is downloaded to a processing device or system and executed. In another embodiment, the set of instructions is stored on a machine accessible medium, such as, for example, a magnetic media (e.g., a floppy disk or magnetic tape), an optically accessible media (e.g., a CD-ROM disk), a flash memory device, etc. The set of instructions is downloaded from the machine accessible medium (using, for example, a floppy disk drive, CD-ROM drive, etc.) and executed. In other embodiments, the disclosed embodiments of the method for caching data using a non-overlapping entry are implemented in hardware, or a combination of hardware and software.

Figure 3:
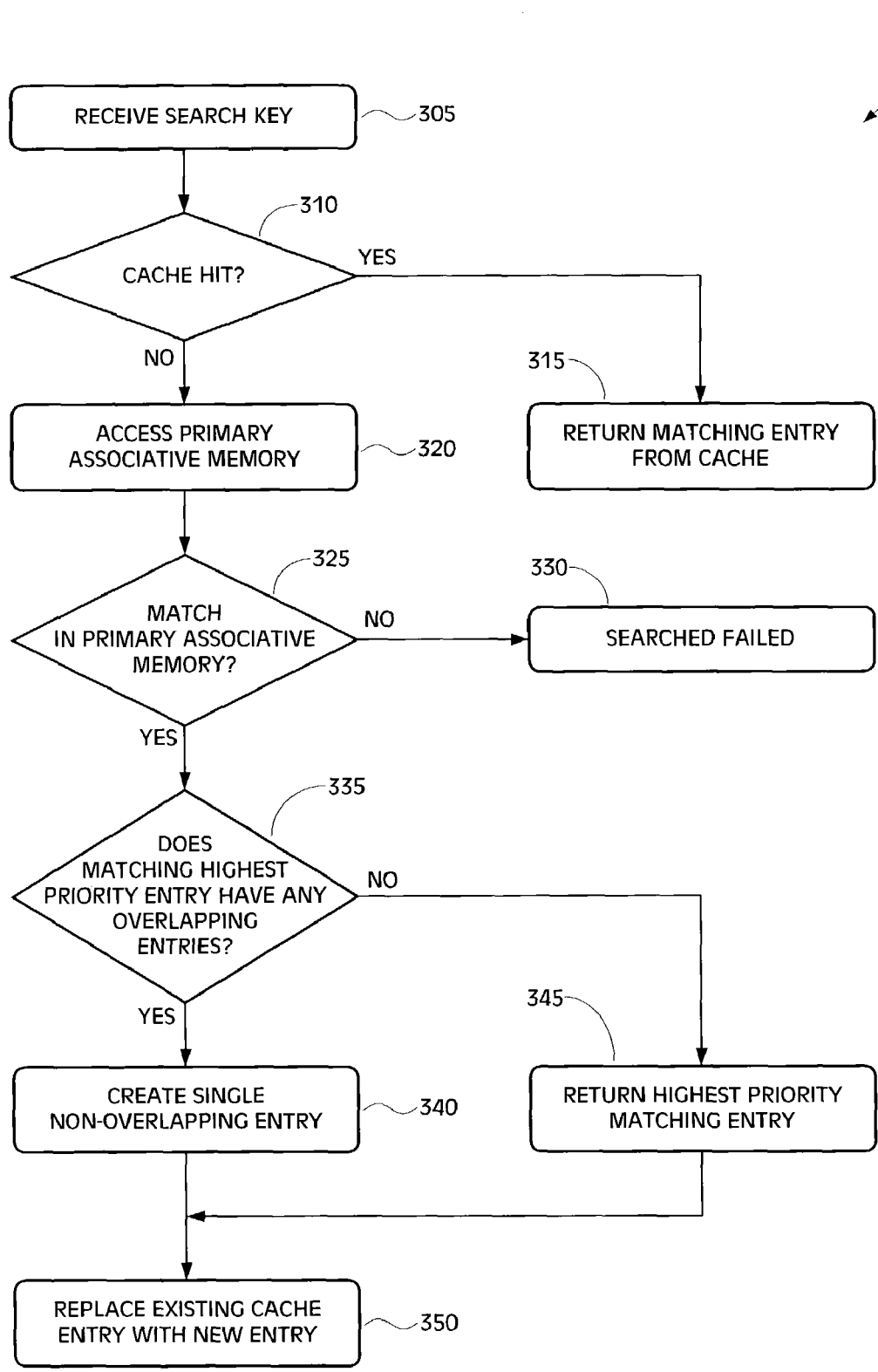
FIG. 3 is a block diagram illustrating an embodiment of a method for caching data using a non-overlapping entry.
Figure 6:
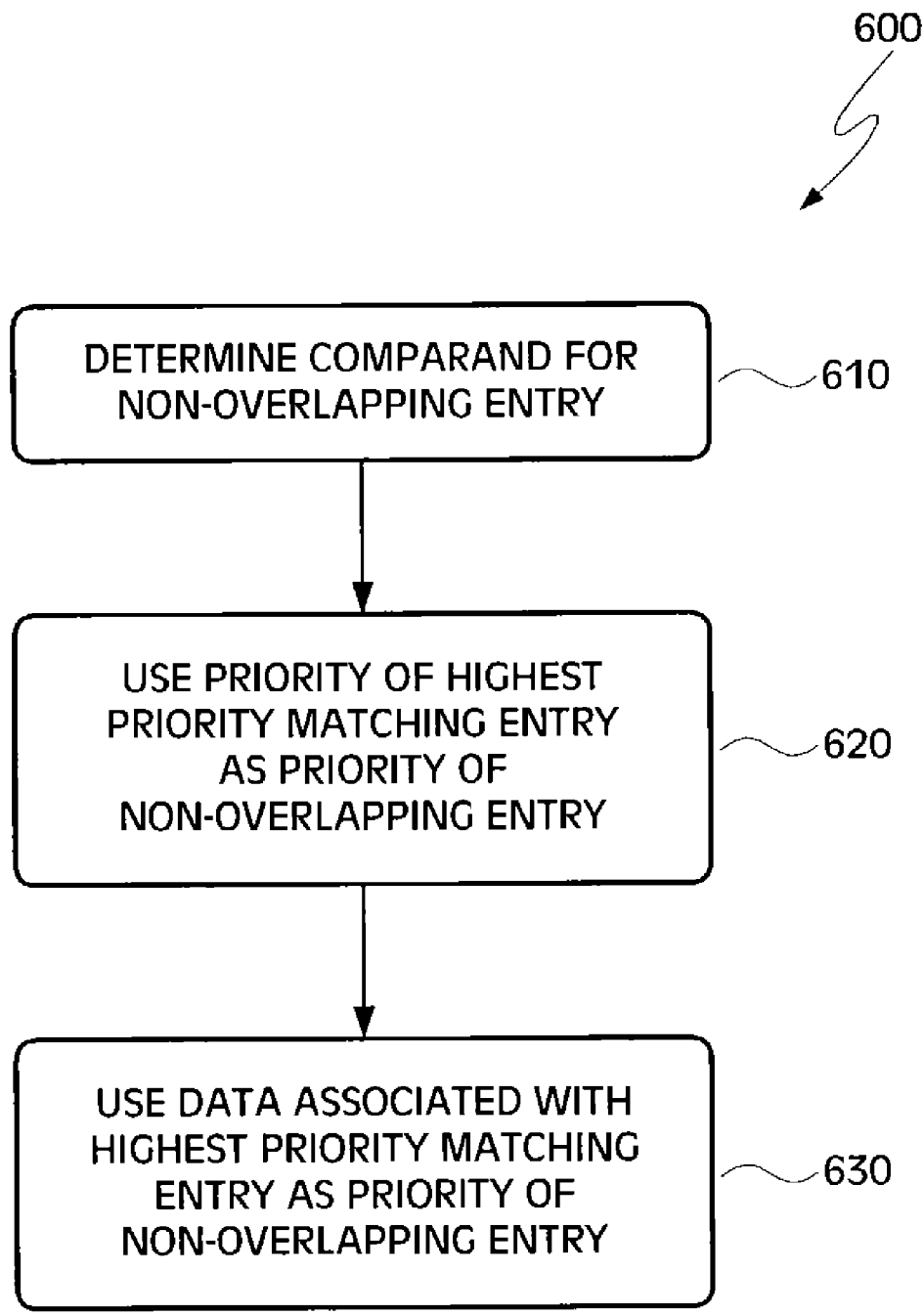
FIG. 6 is a block diagram illustrating an embodiment of a method for creating a single non-overlapping entry.

Illustrated in FIG. 3 is an embodiment of a method 300 of caching data using a single non-overlapping entry, and an embodiment of a method 600 of creating a non-overlapping entry from a matching entry and one or more higher priority overlapping entries is illustrated in FIG. 6. For ease of understanding, the methods 300 and 600 will be described below in the context of the system architecture illustrated in FIG. 2A. However, as noted above, the disclosed embodiments are not limited to any particular architecture.

Referring now to FIG. 3, and to block 305 in particular, a search request including a search key is received from the search client 210. The associative memory cache 220 is searched for the requested data, and if there is a cache hit—see block 310—the matching entry (or associated data) is returned from the associative memory cache, as set forth at block 315. If a cache miss occurred at associative memory cache 220, the primary associative memory 230 is accessed, which is set forth at block 320. If the data requested by the search client is not contained in the primary associative memory—see block 325—the search has failed, as noted at block 330.

Conversely, if the primary associative memory 230 has one or more entries matching the search key—refer again to block 325—the highest priority matching entry is identified and it is determined whether this highest priority matching entry has any higher priority overlapping entries, as set forth at block 335. In an alternative embodiment, a matching entry other than the highest priority matching entry (i.e., a lower priority matching entry) is identified (and used in block 335). If there are no overlapping entries, the primary associative memory 230 returns the highest priority matching entry, which is set forth at block 345. However, referring again to block 335, if the highest priority matching entry does have one or more higher priority overlapping entries, a single non-overlapping entry is created, as set forth at block 340. The creation of a non-overlapping entry is described below in greater detail. Referring to block 350, the new entry (either the non-overlapping entry or the highest priority matching entry) is entered into the associative memory cache 220, and the replacement logic 260 may select an existing entry for replacement (if necessary).

As noted above at block 335 in FIG. 3, any higher priority overlapping entries of the matching entry are identified. The concept of overlapping entries is illustrated, by way of example, in FIGS. 4A–4B and in FIGS. 5A–5B. Overlapping entries in a ternary CAM are shown in FIGS. 4A–4B, whereas overlapping entries in a BAM are shown in FIGS. 5A–5B.

Figures 4A, 4B:
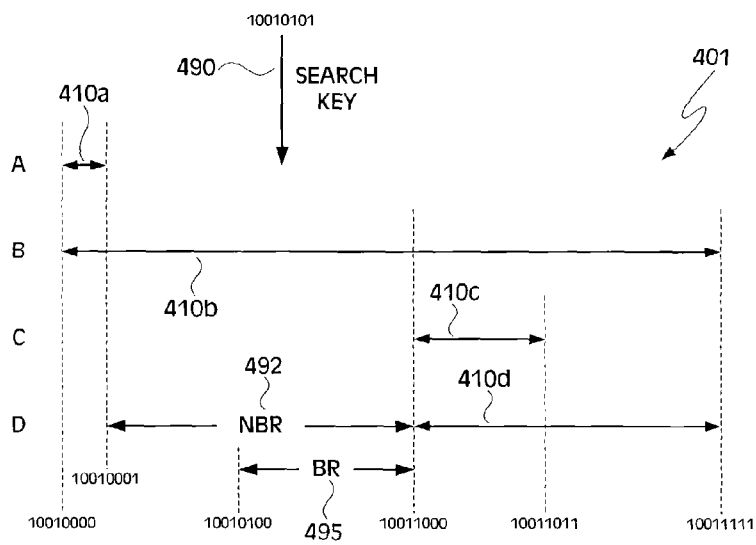
FIGS. 4A–4B are schematic diagrams illustrating application of the disclosed embodiments to a ternary CAM or other associative memory storing binary ranges.
Figure 5A:
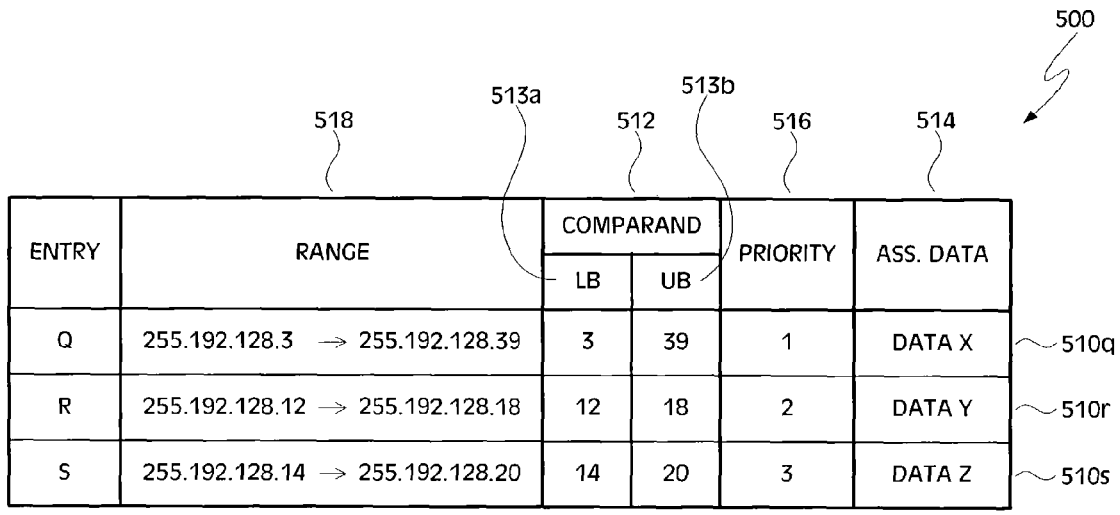
FIGS. 5A–5B are schematic diagram illustrating application of the disclosed embodiments to a BAM or other associative memory storing non-binary ranges.
Figure 5B:
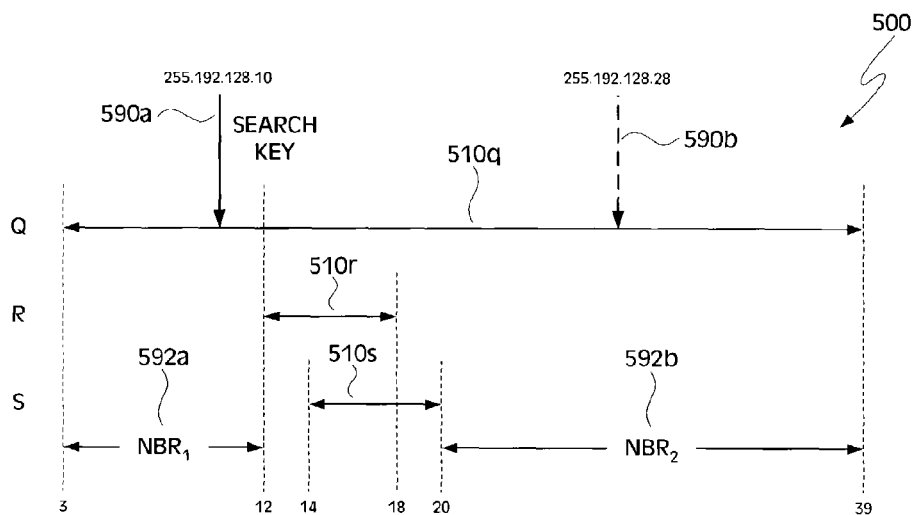

Referring first to FIG. 4A, a database 400 is shown. In the illustrated embodiment, the database 400 comprises a routing table; however, it should be understood that the disclosed embodiments may find use in a wide array of database applications (e.g., packet filter databases, etc.). The routing table 400 includes a number of entries 410a, 410b, 410c, 410d, each entry including a comparand 412 and associated data 414 (e.g., a memory address or other data). Each entry 410a–d may also include a priority value 416. For example, entry 410b (entry "B") has a priority of one, which is the lowest priority, and entry 410a (entry "A") has the highest priority of four. Entries 410c (entry "C") and 410d (entry "D") have priorities of three and two, respectively.

The priority value may correspond to any of a number of different criteria. By way of example, a priority value may be a function of: a weight field stored in the primary associative memory 230, the length of the longest contiguous unmasked field stored in the primary associative memory, the total number of unmasked bits in the primary associative memory, the total number of matching bits in a comparison process, a path length metric derived from a routing protocol (e.g., OSPF), the order of an order-dependent list for a router (e.g., an access control list), or a position in the primary associative memory. The priority field of an entry may, in one embodiment, be dynamically updated to change the relative priorities of the entries in the primary associative memory 230.

The comparand 412 of each entry 410a–d represents a range of destination addresses. For ease of understanding, the comparand range is expressed in dotted decimal formant in column 418 of table 400. For example, entry B has an address range of 128.192.128.144 to 128.192.128.159, and this range expressed in binary format is "10000000 11000000 10000000 1001XXXX", where the "X" character represents a masked (or don't care) bit. Note that, for ease of illustration, only the final octet of each comparand 412 is shown in table 400, as the first three octets would be identical for all entries in the routing table (in this example).

The entries 410a–d of routing table 400 are illustrated graphically in FIG. 4B, which shows a graph 401 illustrating the comparand 412 for each of the entries 410a–d along a horizontal axis. Because each comparand includes a contiguous group of lower order bits, each comparand 412 maps to a single range. Generally, the number of possible values to which a comparand having masked bits can be mapped is equal to $2^N$, where "N" is the number of masked bits. As used herein, the term "range" indicates all values between the smallest value (the lower bound) and the largest value (the upper bound), inclusive.

A search key 490 is also shown in the graph 401, and this search key matches the comparand of entry B (i.e., the search key 10010101 matches the comparand 1001XXX of entry B, the masked bits not being considered in the comparison). Thus, entry B is the highest priority matching entry. However, the comparands of entries A, C, and D have ranges that overlap the range of entry B, and each of entries A, C, and D has a priority that is greater than that of entry B. Thus, each of entry A, C, and D is a higher priority overlapping entry of entry B.

Referring to FIG. 5A, another routing table 500 is illustrated. Routing table 500 includes a number of entries 510q, 510r, 510s, each entry including a comparand 512 and associated data 514 (e.g., a memory address or other data). Each entry 510q–s may also include a priority value 516. For example, entry 510q (entry "Q") has a priority of one (the lowest priority), entry 510r (entry "R") has a priority of two, and entry 510s (entry "S") has a priority of three (the highest priority). As noted above, the priority value may correspond to any one of a wide array of criteria, and the priority value may be dynamically updated to change the relative priorities of the entries.

The comparand 512 of each entry 510q–s represents a range of destination addresses. Each comparand has a lower bound (LB) 513a and an upper bound (UB) 513b. For ease of understanding, the comparand range is expressed in dotted decimal format in column 518 of table 500. For example, entry Q has an address range of 255.192.128.3 to 255.192.128.39, this range having a lower bound 513a of "3" and an upper bound 513b of "39". Once again, for ease of illustration, only the final octet of the LB and UP of each comparand 512 is shown in table 500, as the first three octets would be identical for all entries in the routing table (of this example).

Illustrated in FIG. 5B is a graph 501 showing the comparands 512 of entries 510q–s, wherein the comparands are graphed along a horizontal axis. A search key 590a is also shown in the graph 501, and this search key matches the comparand of entry Q (i.e., the search key 255.192.128.10 falls between the LB (i.e., "3") and the UB (i.e., "39") of entry Q's comparand. Accordingly, entry Q is the highest priority matching entry. However, the comparands of entries R and S have ranges that overlap the range of entry Q, and each of entries R and S has a priority that is greater than that of entry Q. Thus, entries R and S are higher priority overlapping entries of entry Q.

It should be noted here that, for ease of illustration and explanation, the routing table 400 shown in FIG. 4A includes only four entries 410a–d. Similarly, the routing table 500 of FIG. 5A includes only three entries 510q–s. However, those of ordinary skill in the art will appreciate that, in practice, such routing tables may include hundreds or even thousands of entries. Thus, it should be understood that the simple examples presented herein are provided as a guide to understanding the disclosed embodiments, and that no unnecessary limitations should be drawn therefrom.

Turning now to FIG. 6, illustrated is an embodiment of a method of creating a single non-overlapping entry. Referring to block 610, a comparand for the non-overlapping entry is determined. For a ternary CAM, the comparand may comprise a binary range expressed as a bit mask, and for a BAM, the comparand may comprise a non-binary range expressed as a lower bound and upper bound. Methods for creating binary and non-binary comparands for ternary. CAMs and BAMs, respectively, are described in more detail below. Also, it should be noted that, for a binary CAM, the comparand of an entry can contain only an exact match (i.e., no masked bits), as previously described. Referring to blocks 620 and 630, respectively, the priority and associated data of the highest priority matching entry are used for the non-overlapping entry.

Figure 7:
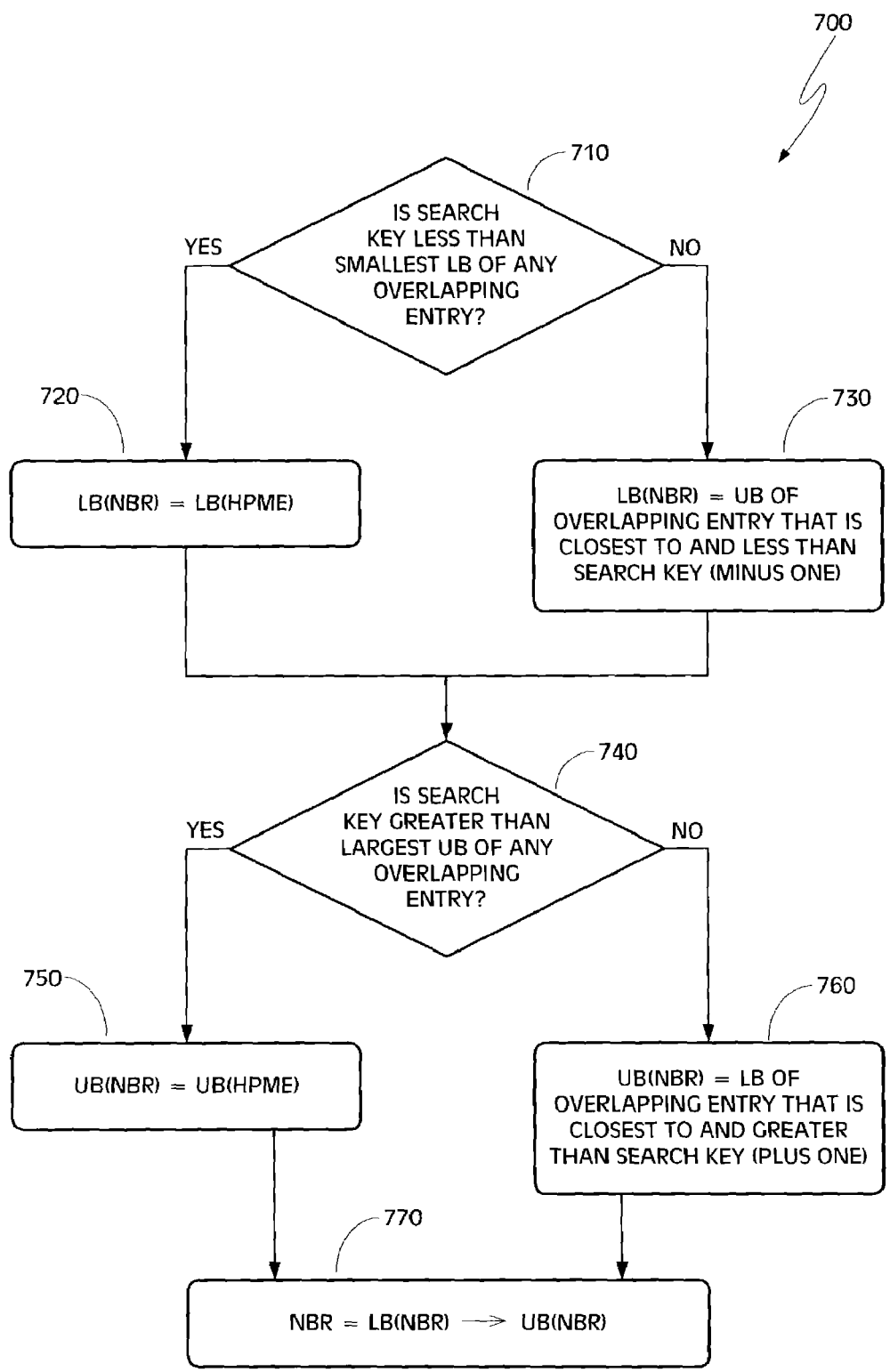
FIG. 7 is a block diagram illustrating an embodiment of a method for determining a non-binary range.

Various methods for determining the comparand of a non-overlapping entry are now described. Illustrated first is the creation of a non-binary comparand (e.g., for a BAM), and an embodiment of a method 700 for determining a non-binary range is shown in FIG. 7. Referring to block 710 in this figure, if the search key is less than the smallest lower bound of all overlapping entries, the lower bound (LB) of the non-binary range (NBR) equals the lower bound of the highest priority matching entry (HPME), which is set forth at block 720. Otherwise, as set forth at block 730, the lower bound of the non-binary range (NBR) equals the upper bound (UB) of the overlapping entry that is closet to, yet less than, the search key (minus one). Referring to block 740, if the search key is greater than the largest upper bound of all overlapping entries, the upper bound of the non-binary range equals the upper bound of the highest priority matching entry, as set forth at block 750. Otherwise, referring to block 760, the upper bound of the non-binary range equals the lower bound of the overlapping entry that is closet to, and greater than, the search key (plus one). As shown at block 770, the non-binary range comprises a range extending from the determined lower bound to the determined upper bound.

In the embodiment of the method 700 illustrated in FIG. 7 and described above, the comparand of the non-overlapping entry is determined based, at least in part, on the highest priority matching entry. However, in another embodiment, the comparand of the non-overlapping entry is created using a matching entry that has a priority less than the highest priority matching entry.

The method 700 of determining a non-binary range is further illustrated by example with respect to FIG. 5B and FIGS. 8A through 8C. Referring back to FIG. 5B, the search key 590a is less than (see block 710) the smallest lower bound of any overlapping entry (entries R and S) and, therefore, the lower bound equals the lower bound of the highest priority matching entry (see block 720). In FIG. 5B, the lower bound of the highest priority matching entry is "3". Search key 590a does not exceed the largest upper bound of the overlapping entries (see block 740). Accordingly, the upper bound of the non-binary range equals the lower bound of that overlapping entry that is closets to and greater than the search key 590a (see block 760). The overlapping entry closest to and greater than search key 590a is entry R, and this entry's lower bound is "12". Thus, the non-binary range 592a corresponding to search key 590a (labeled NBR$_1$) has a lower bound of "3" and an upper bound of "11".

Still referring to FIG. 5B, a second search key 590b is shown, this second search key being equal to "255.192.128.28". The search key 590b exceeds the smallest lower bound of the overlapping entries (see block 710). Therefore, the lower bound of the non-binary range equals the upper bound of the overlapping entry closest to and less than the search key 590b (see block 730). The overlapping entry closest to and less than search key 590b is entry S, which has an upper bound of "20" (the lower bound of our binary range being "21"). The search key is, however, greater than the largest upper bound of any overlapping entry (see block 740) and, accordingly, the upper bound of the non-binary range equals the upper bound of the highest priority matching entry (see block 750), which in this example is "39". In sum, the binary range 592b for search key 590b extends from a lower bound of "21" to an upper bound of "39" (labeled NBR$_2$).

Figure 8A:
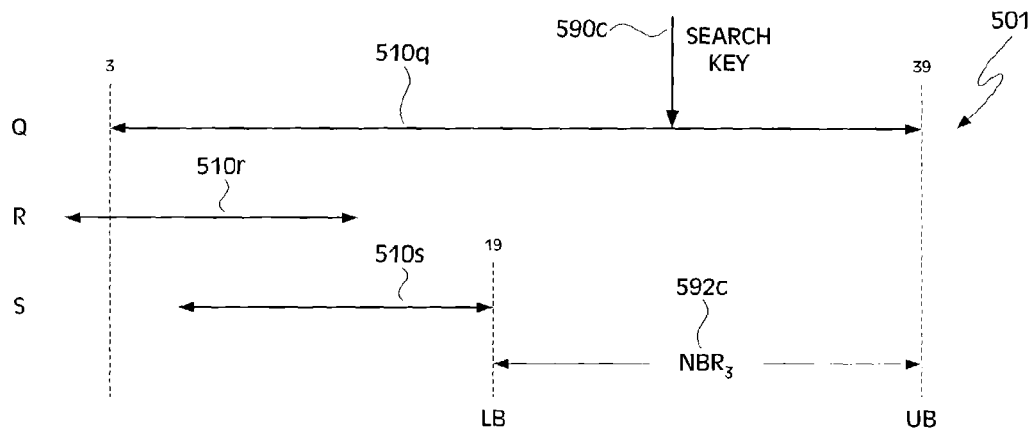
FIGS. 8A–8C are schematic diagrams that, along with FIG. 5B, illustrate the method for determining a non-binary range shown in FIG. 7.
Figure 8B:
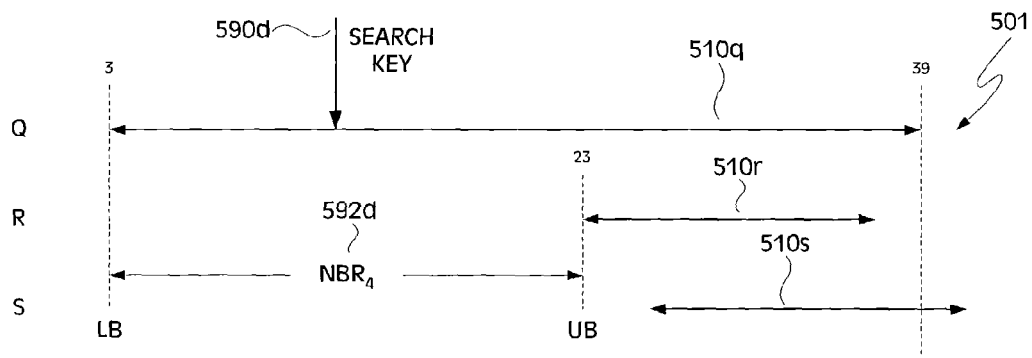
Figure 8C:
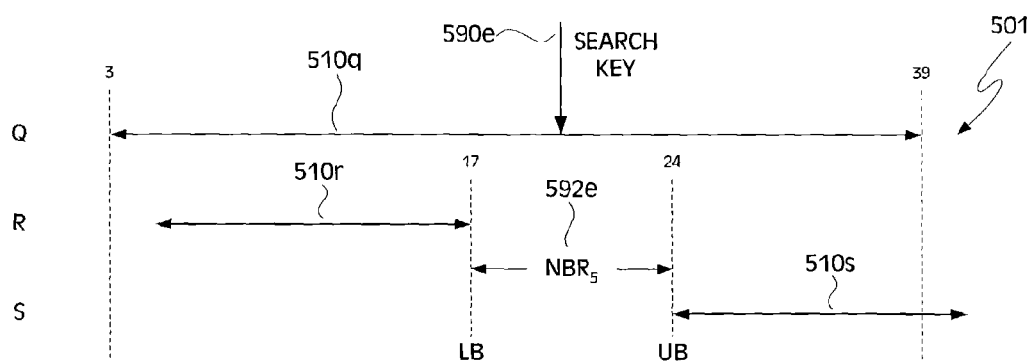

Further examples of the method 700 are illustrated in each of FIGS. 8A–8C. Note that, in FIGS. 8A–8C, the range of each of entries R and S has been varied from that shown in FIG. 5B. Applying the method 700, as described above, the non-binary range 592c (labeled NBR$_3$) for a search key 590c shown in FIG. 8A extends from a LB of "20" to a UB of "39" (the comparand for entry S having an upper bound of "19"). For the search key 590d of FIG. 8B, the non-binary range 592d (labeled NBR$_4$) extends from a LB of "3" to a UB of "22" (the comparand for entry R having a lower bound of "23"). Referring to FIG. 8C, the non-binary range 592e (labeled NBR$_5$) for a search key 590e extends from a LB of "18" to a UB of "23" (the comparand for entry R having an upper bound of "17" and the comparand for entry S having a lower bound of "24").

Figure 9:
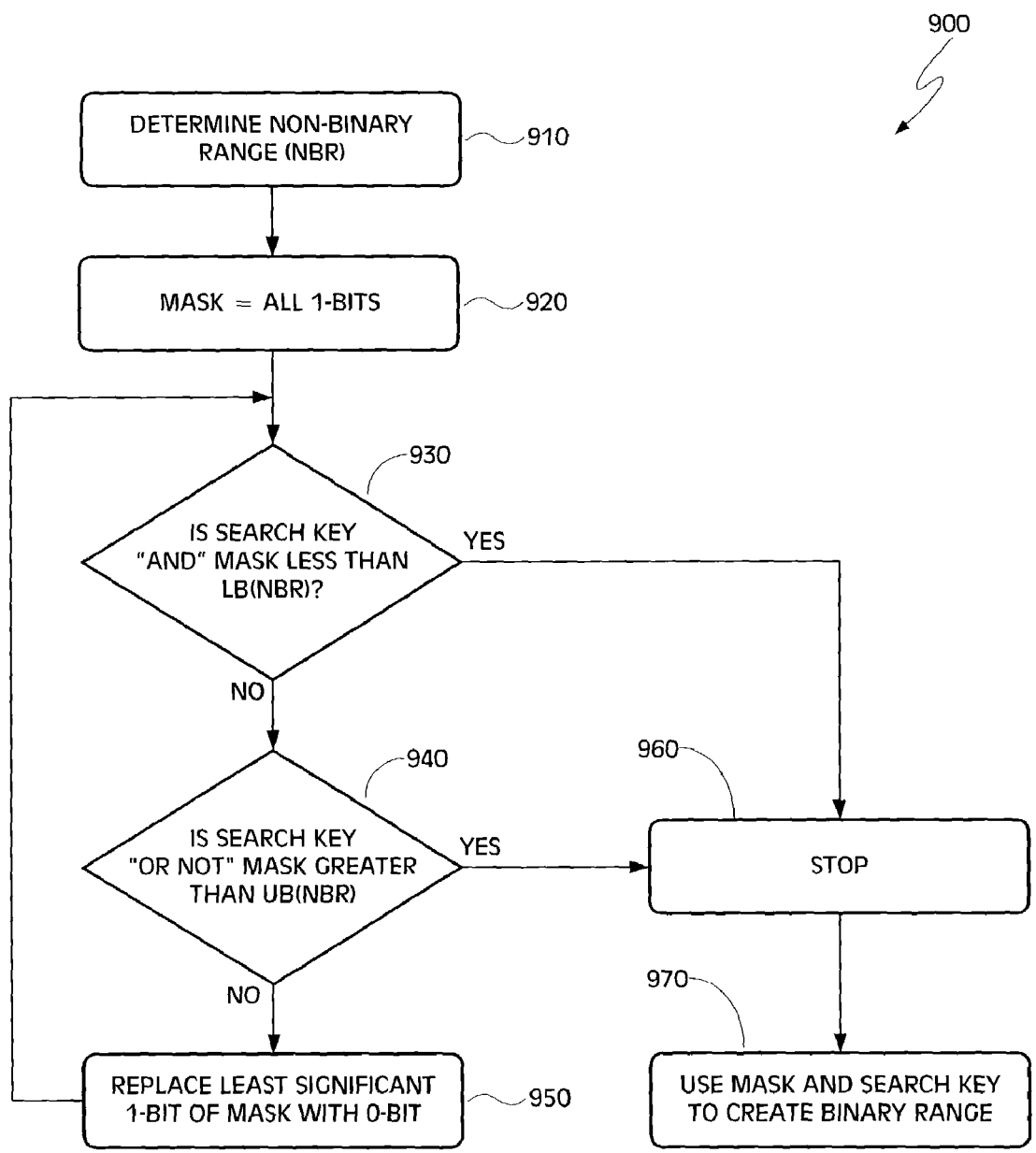
FIG. 9 is a block diagram illustrating an embodiment of a method for determining a binary range.

Referring now to FIG. 9, an embodiment of an algorithm 900 for determining a binary range is illustrated. As set forth at block 910, a non-binary range is first determined for the search key. In one embodiment, determination of the non-binary range proceeds in a manner similar to that described above in FIG. 7. The non-binary ranges has a lower bound and an upper bound (i.e., "LB(NBR)" and "UB(NBR)", respectively). A mask is then created having the same number of bits as the search key, and this mask is initially set to all 1-bits, which is set forth at block 920.

Referring to block 930, the bit-wise "AND" operation is applied to the search key and mask, and if the result is less than the LB(NBR), the process stops, as set forth at block 960. Otherwise, during each iteration, the bit-wise "OR" operation is applied between the search key and the bit-wise "NOT" of the mask—see block 940—and if the result is greater than the UB(NBR), the process will stop (see block 960). If the condition expressed in block 940 is not satisfied, the mask is updated by replacing the least significant 1-bit with a 0-bit, and the algorithm proceeds to the next iteration. In the subsequent iteration, the updated mask in used. When either of the conditions expressed at block 930 or 940 is met, the process will stop (see block 960), and the current mask and search key are used to create the binary range, as set forth at block 970.

The algorithm 900 of FIG. 9 is further illustrated by way of example with respect to FIG. 4B. First, the non-binary range 492 is determined, as described above in FIG. 7 and the accompanying text. This non-binary range 492 has a LB of "10010101" and a UB of "10011000". The LB and UB of the non-binary range 491 and the search key 490 ("10010101") are used to create a mask, as set forth in blocks 920 to 970. Application of the algorithm (blocks 920–970) is shown in Table I below.

TABLE I

| Iteration | Mask (Old) | Search Key "AND" LB(NBR) | Search Key "OR NOT" UB(NBR) | Mask (New) |
|---|---|---|---|---|
| 1 | 11111111 | 10010101 | 10010101 | 11111110 |
| 2 | 11111110 | 10010100 | 10010101 | 11111100 |
| 3 | 11111100 | 10010100 | 10010111 | STOP |

The final mask (i.e., "11111100") and the search key (i.e., "10010101") are then used to create the binary range bit mask of "100101XX", where the "X" character represents a masked bit. This binary range 495 is shown in FIG. 4B. Note that the upper bound of the binary range 495 is one less than the lower bound of each of entries C and D. The binary range 495 can then be used to create a non-overlapping binary entry, as described above.

As noted above, for a binary CAM, the comparison between a search key and a comparand can only produce an exact match. Thus, in a further embodiment, where a binary CAM is used to implement the associative memory cache, a non-overlapping entry is created by inserting as the comparand the search key, and then using the priority and associated data of the highest priority matching entry as the priority and data for the non-overlapping entry.

Embodiments of a method for caching data using a single non-overlapping entry, as well as embodiments of a method for creating a non-overlapping entry, having been herein described, those of ordinary skill in the art will appreciated the advantages of the disclosed embodiments. Storing only a single non-overlapping entry rather than a matching entry and a number overlapping entries results in a minimum number of entries being stored in the associative memory cache. Because the single non-overlapping entry is inserted into the associative cache, only one existing entry will need to be replaced, which simplifies the replacement scheme. Further, the possibility of multiple matches occurring in the associative memory cache is minimized and, therefore, priority resolution may be unnecessary in the cache. As noted above, the disclosed embodiments can be implemented using many different types of associative memory (e.g., a CAM, BAM, or an algorithmic search of a SRAM or DRAM), and the disclosed embodiments can also be implemented in a system having multiple levels of associative cache.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   searching an associative memory cache using a search key;
   in response to a miss at the associative memory cache, accessing a primary associative memory;
   identifying in the primary associative memory an entry matching the search key and a number of overlapping entries; and
   creating a non-overlapping entry, the non-overlapping entry having a range that includes at least a portion of a range of the matching entry and that does not include ranges of the overlapping entries.

2. The method of claim 1, wherein the matching entry comprises a highest priority matching entry.

3. The method of claim 1, wherein the range of the non-overlapping entry includes the largest possible portion of the range of the matching entry.

4. The method of claim 1, further comprising entering the non-overlapping entry into the associative memory cache.

5. The method of claim 4, further comprising:
   identifying an existing entry in the associative memory cache for replacement; and
   replacing the identified existing entry with the non-overlapping entry.

6. The method of claim 1, wherein creating the non-overlapping entry comprises:
   determining a comparand for the non-overlapping entry; and
   using a priority of the matching entry as a priority of the non-overlapping entry.

7. The method of claim 6, wherein creating the non-overlapping entry further comprises using data associated with the matching entry as data associated with the non-overlapping entry.

8. The method of claim 6, wherein determining the comparand for the non-overlapping entry comprises determining a binary range.

9. The method of claim 8, wherein the associative memory cache comprises a ternary content addressable memory (CAM).

10. The method of claim 6, wherein determining the comparand for the non-overlapping entry comprises determining a non-binary range.

11. The method of claim 10, wherein the associative memory cache comprises a boundary addressable memory (BAM).

12. The method of claim 6, wherein determining the comparand for the non-overlapping entry comprises using the search key as the comparand.

13. The method of claim 12, wherein the associative memory cache comprises a binary CAM.

14. An apparatus comprising:
   an associative memory cache;
   a primary associative memory;
   a cache control coupled with each of the associative memory cache and the primary associative memory, the cache control to search the associative memory cache using a search key and, in response to a miss, access the primary associative memory to identify an entry matching the search key and a number of overlapping entries; and
   a conversion module coupled with the cache control, the conversion module to create a non-overlapping entry, the non-overlapping entry having a range that includes at least a portion of a range of the matching entry and that does not include ranges of the overlapping entries.

15. The apparatus of claim 14, wherein the matching entry identified by the cache control comprises a highest priority matching entry.

16. The apparatus of claim 14, further comprising a search client coupled with the cache control, the search client to issue a search request to the cache control, the search request including the search key.

17. The apparatus of claim 14, further comprising replacement logic coupled with the cache control, the replacement logic to select an existing entry in the associative memory cache for replacement by the non-overlapping entry.

18. The apparatus of claim 14, wherein to create the non-overlapping entry, the conversion module determines a comparand for the non-overlapping entry and uses a priority of the matching entry as a priority of the non-overlapping entry.

19. The apparatus of claim 18, wherein to create the non-overlapping entry, the conversion module uses data associated with the matching entry as data associated with the non-overlapping entry.

20. The apparatus of claim 18, wherein the comparand comprises one of a binary range and a non-binary range.

21. The apparatus of claim 14, further comprising a second associative memory cache coupled with the cache control.

22. The apparatus of claim 14, wherein the associative memory cache, the primary associative memory, the cache control, and the conversion module are located on a single integrated circuit device.

23. The apparatus of claim 14, wherein the associative memory cache comprises an off-chip associative memory.

24. The apparatus of claim 14, wherein the primary associative memory comprises an off-chip associative memory.

25. The apparatus of claim 14, wherein the associative memory cache comprises one of a binary content addressable memory (CAM), a ternary CAM, and a boundary addressable memory (BAM).

26. The apparatus of claim 14, wherein the primary associative memory comprises one of a ternary CAM and a BAM.

27. The apparatus of claim 14, wherein the primary associative memory comprises:
a memory; and
a search engine coupled with the memory and the cache control, the search engine including an algorithm to utilize the memory as an associative memory.

28. The apparatus of claim 27, wherein the memory comprises one of a static random access memory (SRAM) and a dynamic random access memory (DRAM).

29. The apparatus of claim 27, wherein the memory comprises an off-chip memory.

30. A network processor comprising:
an associative memory cache;
a search engine coupled with a dynamic random access memory (DRAM), the search engine including an algorithm to utilize the DRAM as an associative memory;
a cache control coupled with each of the associative memory cache and the search engine, the cache control to search the associative memory cache using a search key and, in response to a miss, access the DRAM to identify an entry matching the search key and a number of overlapping entries; and
a conversion module coupled with the cache control, the conversion module to create a non-overlapping entry, the non-overlapping entry having a range that includes at least a portion of a range of the matching entry and that does not include ranges of the overlapping entries.

31. The network processor of claim 30, wherein the matching entry identified by the cache control comprises a highest priority matching entry.

32. The network processor of claim 30, further comprising a search client coupled with the cache control, the search client to issue a search request to the cache control, the search request including the search key.

33. The network processor of claim 30, wherein the search key is received from an off-chip search client.

34. The network processor of claim 30, further comprising replacement logic coupled with the cache control, the replacement logic to select an existing entry in the associative memory cache for replacement by the non-overlapping entry.

35. The network processor of claim 30, wherein to create the non-overlapping entry, the conversion module determines a comparand for the non-overlapping entry and uses a priority of the highest priority matching entry as a priority of the non-overlapping entry.

36. The network processor of claim 35, wherein to create the non-overlapping entry, the conversion module uses data associated with the highest priority matching entry as data associated with the non-overlapping entry.

37. The network processor of claim 35, wherein the comparand comprises one of a binary range and a non-binary range.

38. The network processor of claim 30, further comprising a second associative memory cache coupled with the cache control.

39. The network processor of claim 38, wherein the second associative memory cache comprises an off-chip associative memory.

40. The network processor of claim 30, wherein the associative memory cache comprises one of a binary content addressable memory (CAM), a ternary CAM, and a boundary addressable memory (BAM).

41. The network processor of claim 30, wherein the DRAM comprises part of the network processor.

42. An article of manufacture comprising:
a machine accessible medium providing content that, when accessed by a machine, causes the machine to
search an associative memory cache using a search key;
in response to a miss at the associative memory cache, access a primary associative memory;
identify in the primary associative memory an entry matching the search key and a number of overlapping entries; and
create a non-overlapping entry, the non-overlapping entry having a range that includes at least a portion of a range of the matching entry and that does not include ranges of the overlapping entries.

43. The article of manufacture of claim 42, wherein the matching entry comprises a highest priority matching entry.

44. The article of manufacture of claim 42, wherein the range of the non-overlapping entry includes the largest possible portion of the range of the matching entry.

45. The article of manufacture of claim 42, wherein the content, when accessed, further causes the machine to enter the non-overlapping entry into the associative memory cache.

46. The article of manufacture of claim 45, wherein the content, when accessed, further causes the machine to:

identify an existing entry in the associative memory cache for replacement; and replace the identified existing entry with the non-overlapping entry.

47. The article of manufacture of claim 42, wherein the content, when accessed, further causes the machine, when creating the non-overlapping entry, to:

determine a comparand for the non-overlapping entry; and use a priority of the matching entry as a priority of the non-overlapping entry.

48. The article of manufacture of claim 47, wherein the content, when accessed, further causes the machine, when creating the non-overlapping entry, to use data associated with the matching entry as data associated with the non-overlapping entry.

49. The article of manufacture of claim 47, wherein the comparand comprises one of a binary range and a non-binary range.

* * * * *

UNITED STATES PATENT AND TRADEMARK OFFICE
CERTIFICATE OF CORRECTION

| | |
|---|---|
| PATENT NO. | : 7,013,367 B2 |
| APPLICATION NO. | : 10/622311 |
| DATED | : March 14, 2006 |
| INVENTOR(S) | : Henderson et al. |

It is certified that error appears in the above-identified patent and that said Letters Patent is hereby corrected as shown below:

In column 4, at line 33, delete "organ" and insert --or an--.

Signed and Sealed this

Second Day of September, 2008

JON W. DUDAS
*Director of the United States Patent and Trademark Office*